(12) United States Patent
Nix

(10) Patent No.: US 8,063,771 B2
(45) Date of Patent: Nov. 22, 2011

(54) MARINE PERSONAL LOCATOR APPARATUS

(75) Inventor: Anthony Ronald Nix, Wellington Point (AU)

(73) Assignee: Seasafe Pty Ltd, Queensland (AU)

( * ) Notice: Subject to any disclaimer, the term of this patent is extended or adjusted under 35 U.S.C. 154(b) by 945 days.

(21) Appl. No.: 11/791,432

(22) PCT Filed: Nov. 22, 2005

(86) PCT No.: PCT/AU2005/001769
§ 371 (c)(1),
(2), (4) Date: Nov. 6, 2007

(87) PCT Pub. No.: WO2006/053399
PCT Pub. Date: May 26, 2006

(65) Prior Publication Data
US 2008/0198003 A1   Aug. 21, 2008

(30) Foreign Application Priority Data

Nov. 22, 2004 (AU) ............................ 2004906694

(51) Int. Cl.
*G08B 1/08* (2006.01)
*G08B 23/00* (2006.01)
*G01S 5/02* (2010.01)
(52) U.S. Cl. .............. 340/539.13; 340/573.6; 342/417
(58) Field of Classification Search .......... 340/539.13
See application file for complete search history.

(56) References Cited

U.S. PATENT DOCUMENTS

| 3,175,192 | A | * | 3/1965 | Keltner | 340/825.75 |
|---|---|---|---|---|---|
| 3,961,259 | A | * | 6/1976 | Elstow et al. | 455/66.1 |
| 4,302,746 | A | * | 11/1981 | Scarzello et al. | 340/938 |
| 4,788,711 | A | * | 11/1988 | Nasco, Jr. | 455/404.1 |
| 4,870,370 | A | * | 9/1989 | Hedberg et al. | 330/133 |
| 4,887,064 | A | * | 12/1989 | Drori et al. | 340/5.23 |
| 5,844,482 | A | * | 12/1998 | Guthrie et al. | 340/572.4 |
| 6,057,759 | A | * | 5/2000 | Marsh | 340/539.11 |
| 6,222,484 | B1 | * | 4/2001 | Seiple et al. | 342/357.55 |
| 6,515,635 | B2 | * | 2/2003 | Chiang et al. | 343/834 |

\* cited by examiner

*Primary Examiner* — Jennifer Mehmood
*Assistant Examiner* — John Mortell
(74) *Attorney, Agent, or Firm* — Abelman, Frayne & Schwab

(57) ABSTRACT

Marine personal locator system including personal transmitters activated by immersion and a receiver. The transmitter includes a microprocessor adapted to effect transmission of a unique tone identifying the transmitter. The receiver includes an omnidirectional and a yagi antenna switchable to a tuned RF amplifier, mixed with a frequency doubled crystal oscillator local oscillator signal, filtering, processing to retrieve any unique identifying tone, and signal strength detection and indication means. The transmitters are worn by sailors and the receiver is located on a vessel. The receiver is operable to monitor for any signals of a transmitter worn by a sailor fallen overboard using the omnidirectional antenna and sound a siren in the event of reception of such a signal. A sailor operating the receiver can switch to use the yagi antenna and using the signal strength indication means determine and monitor the direction of an overboard sailor relative to the vessel.

14 Claims, 5 Drawing Sheets

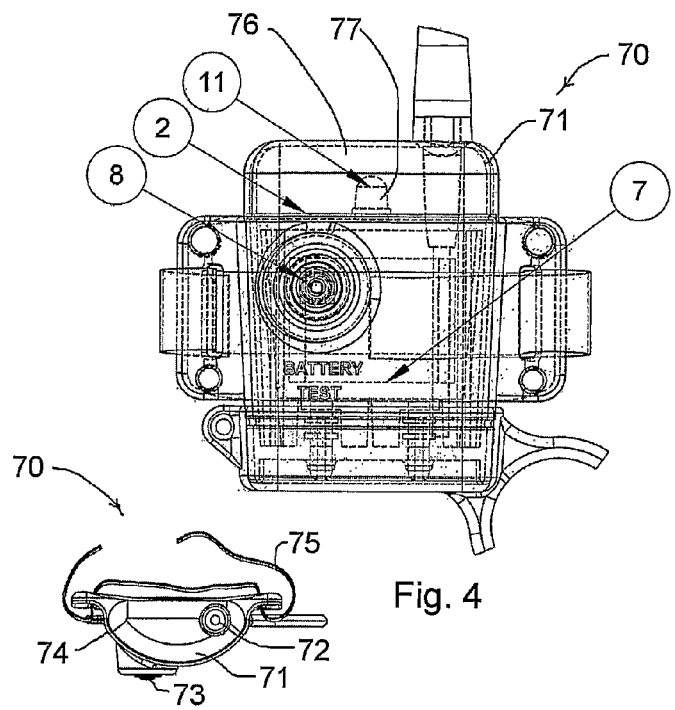
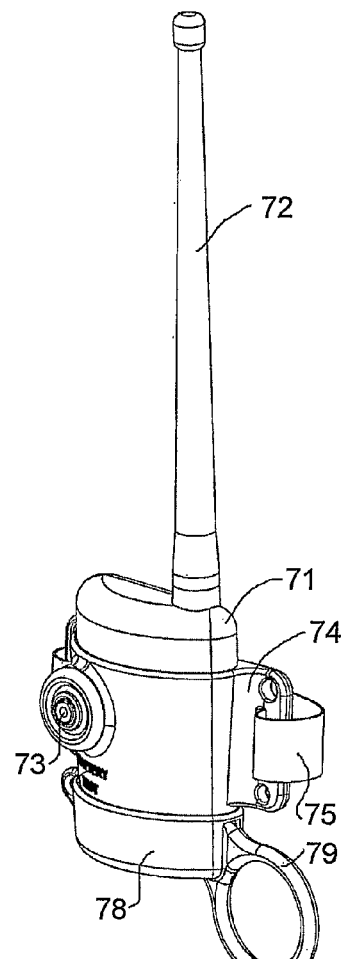
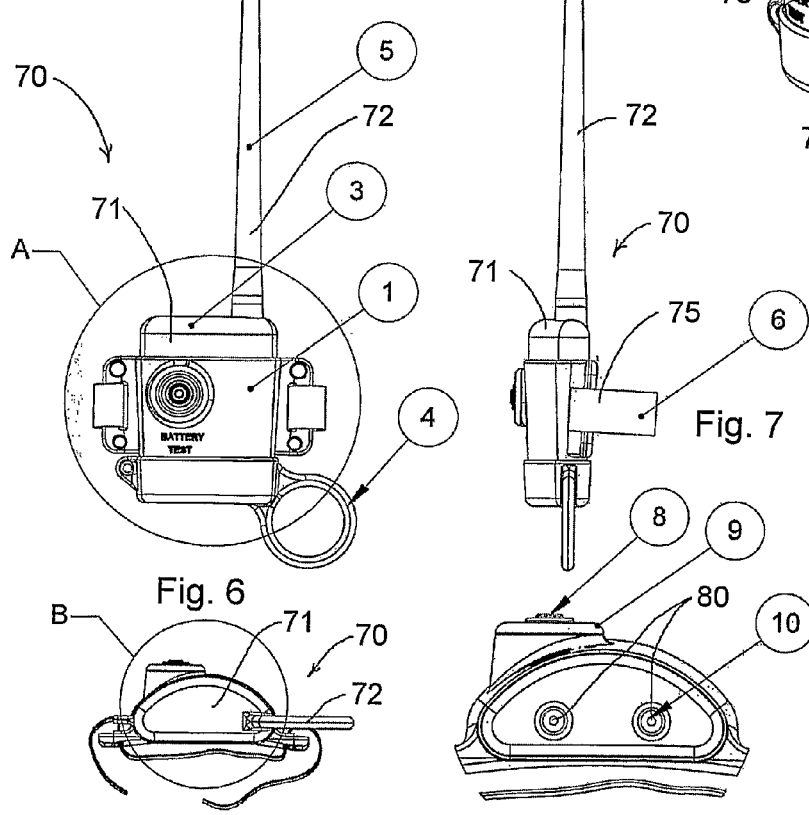
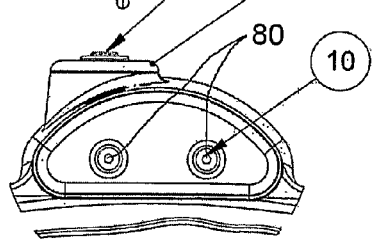
Fig. 3
Fig. 4
Fig. 5
Fig. 6
Fig. 7
Fig. 8
Fig. 9

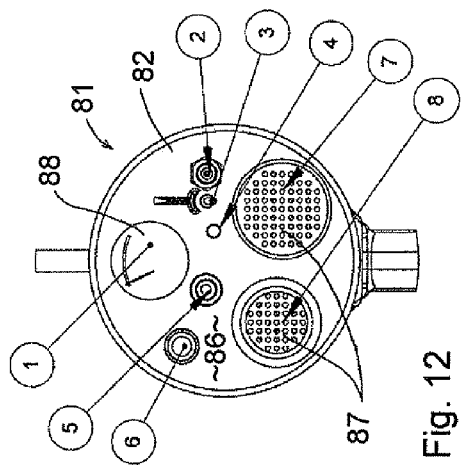
Fig. 12
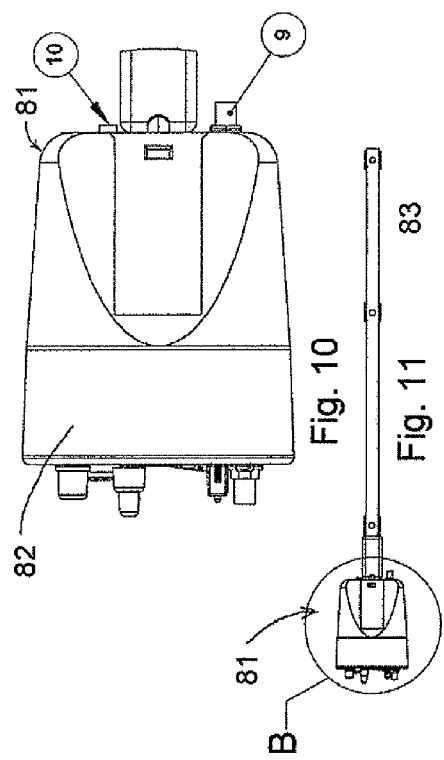
Fig. 10
Fig. 11
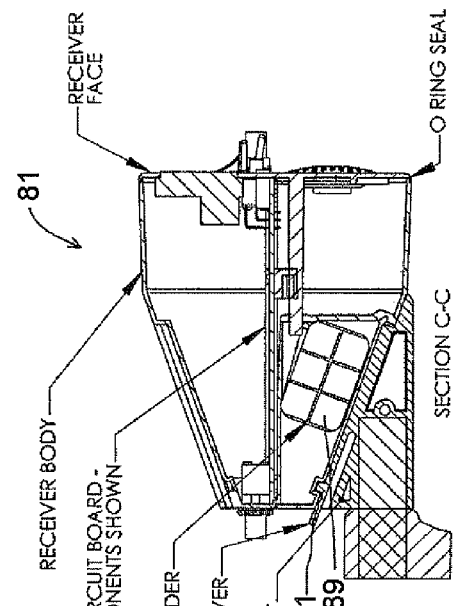
Fig. 13
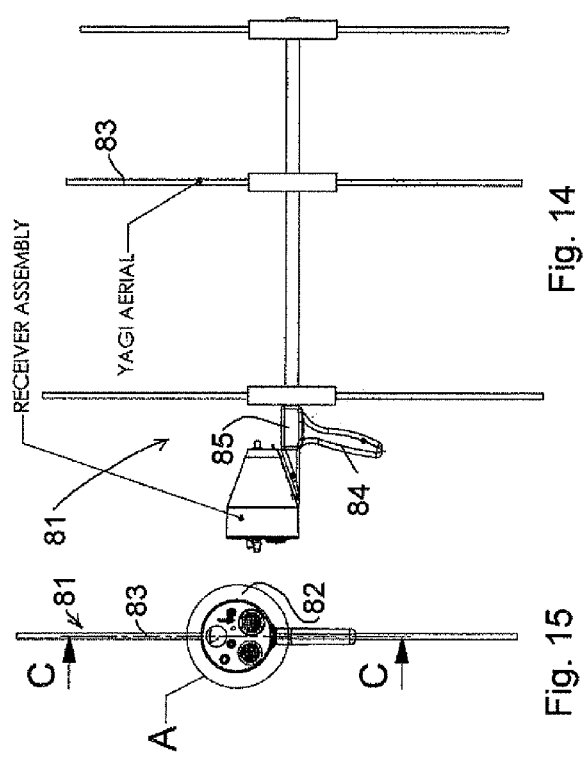
Fig. 14
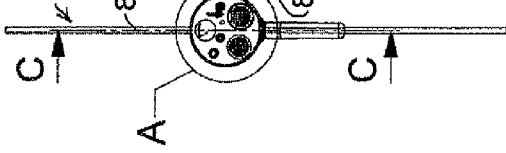
Fig. 15

SURFACE MOUNT SHOWN FOR TOP MOUNTING ON DASHBOARD. CAN ALSO MOUNT ON TOP OF UNIT FOR UNDERSIDE MOUNTING ON ROOF

MARINE PERSONAL LOCATOR APPARATUS

FIELD OF INVENTION

THIS INVENTION relates to marine personal locator apparatus. The invention is primarily directed to locator apparatus for transmitting a radio signal warning of a "man overboard" incident and indicating location of transmission. However, the invention is not limited to this field of use.

BACKGROUND ART

Loss prevention at sea represents a significant problem despite the development of recent technologies and their widespread adoption, including, for example, emergency position indicating radio beacon (EPIRB) technology. However, EPIRB devices are primarily directed to locating vessels rather than individuals. If a distressed vessel founders and its EPIRB is activated, the persons cast into the sea are required to stay together, otherwise, individuals who cannot stay with the others may not be rescued.

The present invention aims to marine personal locator apparatus which alleviates one or more of the aforementioned problems. Other aims and advantages of the invention may become apparent from the following description.

DISCLOSURE OF THE INVENTION

With the foregoing in view, this invention resides broadly in marine personal locator apparatus comprising one or more transmitter units operatively wirelessly associated with one or more receiver units, the or each transmitter unit including:

a transmitter power supply;

a transmitter microcontroller in electrical connection with the transmitter power supply for controlling electrical power and producing electrical signals according to a predetermined transmitter control program;

a voltage regulator in electrical connection with the power transmitter power supply and in operative connection with the transmitter microcontroller for enabling of the voltage regulator to provide a regulated potential output;

a crystal oscillator modulator operatively connected to the regulated potential output from the voltage regulator and in signal connection with the transmitter microcontroller for receiving the electrical signals when produced by the transmitter microcontroller, the crystal oscillator modulator producing a frequency output being half of a desired frequency;

a frequency doubler in operative connection with the regulated potential output from the voltage regulator and the frequency output from the crystal oscillator modulator for producing a pre-amp frequency output;

filter and amplification means operatively connected to the regulated potential output from the voltage regulator and the pre-amp frequency output from the frequency doubler, the filter and amplification means being operable to provide bandpass filtering, amplification and lowpass filtering of the signal; and an antenna matching network in operative connection with the filter and amplification means for providing transmission signal for broadcasting from a transmitter antenna;

and the or each receiver unit including:

an omni-directional antenna and uni-directional antenna operatively connected to antenna selection means operable for selection between the omni-directional antenna and the uni-directional antenna, the uni-directional antenna having means for orientation thereof in a range of directions;

a tuned radio frequency amplifier unit in operative connection with a the antenna selection means for amplifying radio frequency signals received by the omni-directional antenna and the uni-directional antenna when selected by the antenna selection means to produce an amplified radio signal;

primary signal mixing means operatively associated with the tuned radio frequency amplifier unit for mixing a predetermined frequency signal with the amplified radio signal to produce a mixed signal;

tuned filter and amplification means operatively associated with the primary signal mixing means for amplifying the predetermined frequency signal portion of the mixed signal to produce a conditioned signal;

a secondary signal mixing means operatively associated with the tuned filter and amplification mean for mixing with a plurality of radio frequency tones, the secondary signal mixing means also incorporating a radio signal strength detection means;

tone decoding and combining means operatively connected to the secondary signal mixing means and operable to receive the radio frequency tones and produce an alarm signal output upon receipt of a predetermined number of the radio frequency tones;

alarm output means operatively connected to the tone decoding and combining means and operable to generate an alarm detectable by a user by sight, sound or other means;

tone control means operatively connected to the secondary signal mixing means and operable in conjunction with the radio signal strength detection means for producing a range of tones correlating with the strength of the amplified radio signal with respect to the strength of the other signals mixed therewith; and output means operatively connected to the tone control means and operable to generate an output detectable by a user by sight, sound or other means.

In another aspect, the present invention resides broadly in a transmitter unit for marine personal locator apparatus comprising one or more said transmitter units operatively wirelessly associated with one or more receiver units, the or each transmitter unit including:

a transmitter power supply;

a transmitter microcontroller in electrical connection with the transmitter power supply for controlling electrical power and producing electrical signals according to a predetermined transmitter control program;

a voltage regulator in electrical connection with the power transmitter power supply and in operative connection with the transmitter microcontroller for enabling of the voltage regulator to provide a regulated potential output;

a crystal oscillator modulator operatively connected to the regulated potential output from the voltage regulator and in signal connection with the transmitter microcontroller for receiving the electrical signals when produced by the transmitter microcontroller, the crystal oscillator modulator producing a frequency output being half of a desired frequency;

a frequency doubler in operative connection with the regulated potential output from the voltage regulator and the frequency output from the crystal oscillator modulator for producing a pre-amp frequency output;

filter and amplification means operatively connected to the regulated potential output from the voltage regulator and the pre-amp frequency output from the frequency doubler, the filter and amplification means being operable to provide bandpass filtering, amplification and lowpass filtering of the signal; and an antenna matching network in operative connection with the filter and amplification means for providing transmission signal for broadcasting from a transmitter antenna.

In another aspect, the present invention resides broadly in a receiver unit for marine personal locator apparatus comprising one or more transmitter units operatively wirelessly associated with one or more said receiver units, the or each receiver unit including:

an omni-directional antenna and uni-directional antenna operatively connected to antenna selection means operable for selection between the omni-directional antenna and the uni-directional antenna, the uni-directional antenna having means for orientation thereof in a range of directions;

a tuned radio frequency amplifier unit in operative connection with a the antenna selection means for amplifying radio frequency signals received by the omni-directional antenna and the uni-directional antenna when selected by the antenna selection means to produce an amplified radio signal;

primary signal mixing means operatively associated with the tuned radio frequency amplifier unit for mixing a predetermined frequency signal with the amplified radio signal to produce a mixed signal;

tuned filter and amplification means operatively associated with the primary signal mixing means for amplifying the predetermined frequency signal portion of the mixed signal to produce a conditioned signal;

a secondary signal mixing means operatively associated with the tuned filter and amplification mean for mixing with a plurality of radio frequency tones, the secondary signal mixing means also incorporating a radio signal strength detection means;

tone decoding and combining means operatively connected to the secondary signal mixing means and operable to receive the radio frequency tones and produce an alarm signal output upon receipt of a predetermined number of the radio frequency tones;

alarm output means operatively connected to the tone decoding and combining means and operable to generate an alarm detectable by a user by sight, sound or other means;

tone control means operatively connected to the secondary signal mixing means and operable in conjunction with the radio signal strength detection means for producing a range of tones correlating with the strength of the amplified radio signal with respect to the strength of the other signals mixed therewith; and output means operatively connected to the tone control means and operable to generate an output detectable by a user by sight, sound or other means.

Preferably, the predetermined transmitter control program is operable to provide random switching whereby the electrical signals are provided at random intervals upon activation. Activation is preferably by closing of an immersion switch. IT is also preferred that a manual switch be provided for testing of the transmitter unit. The transmitter microcontroller preferably generates three different low frequency tones for frequency modulating the frequency output from the crystal oscillator modulator.

The receiver unit may operate off an external power supply or by internal batteries. Preferably, the receiver unit includes a power supply selector for selection of either the external power supply or the internal batteries. Preferably, the primary signal mixing means includes a tuned radio frequency amplifier in operative connection with a stepped and fine gain control assembly to enable searching for a signal produced by one or more transmitter units. The tuned filter and amplification means preferably includes a mixer operatively connected to a crystal oscillator ("the half-frequency oscillator") through a doubler ("the receiver doubler"), and a frequency specific amplifier connected to the mixer through an input filter and to the secondary signal mixing means through an output filter.

The secondary signal mixing means preferably includes a second mixer and secondary crystalline oscillator, an intermediate frequency amplifier and limiter and the radio signal strength indicator detector ("RSSI detector"). In such form, the secondary signal mixing means further includes two tone filters. The tone decoding and combining means preferably includes three tone decoders each in operative connection with a respective hold circuit operable to hold the tone on for a predetermined period of time. Preferably, each tone is held on for a period of six seconds. The hold circuits are each in operative connection with a combining circuit for combining the signals produced by the hold circuits. Preferably, the combined signal is fed to a siren driver to produce an audible sound upon receipt of the appropriate signal from one or more of the transmitter units. Optionally, the siren driver further or alternatively includes an autodialler interface for dialing the receiver unit into a telephone network, such as the public switched telephone network, cellular wireless network or such like.

Preferably, the tone control means includes a tone controller connected to the RSSI detector, a tone generator connected to an audio amplifier and siren and/or headphones. In such form, it is preferred that a volume control be provided.

BRIEF DESCRIPTION OF THE DRAWINGS

In order that the invention may be more readily understood and put into practical effect, reference will now be made to the accompanying drawings which illustrate a preferred embodiment of the invention and wherein:

FIG. 3 is a pictorial view of transmitter unit for a marine personal locator apparatus according to the invention;

FIG. 4 is a diagrammatic sectional view of the transmitter unit of FIG. 3;

FIG. 5 is a plan view of the transmitter unit of FIG. 3;

FIGS. 6, 7 and 8 respectively show the front elevation, side elevation and plan view of the transmitter unit of FIG. 3 as an orthographic projection;

FIG. 9 is an underside view of the transmitter unit of FIG. 3;

FIGS. 10 and 11 show in front elevation view a receiver unit for marine personal locator apparatus according to the invention (FIG. 10 with the antenna not shown);

FIG. 12 is a face view of the receiver unit of FIGS. 10 and 11;

FIG. 13 is a somewhat diagrammatic sectional view of the receiver unit of FIGS. 9 and 10;

FIG. 14 is a front view of the receiver unit of FIGS. 10 and 11 with the aerial fully deployed;

FIG. 15 is an end view of the receiver apparatus of FIG. 14;

DETAILED DESCRIPTION OF THE DRAWINGS

Figure 1:
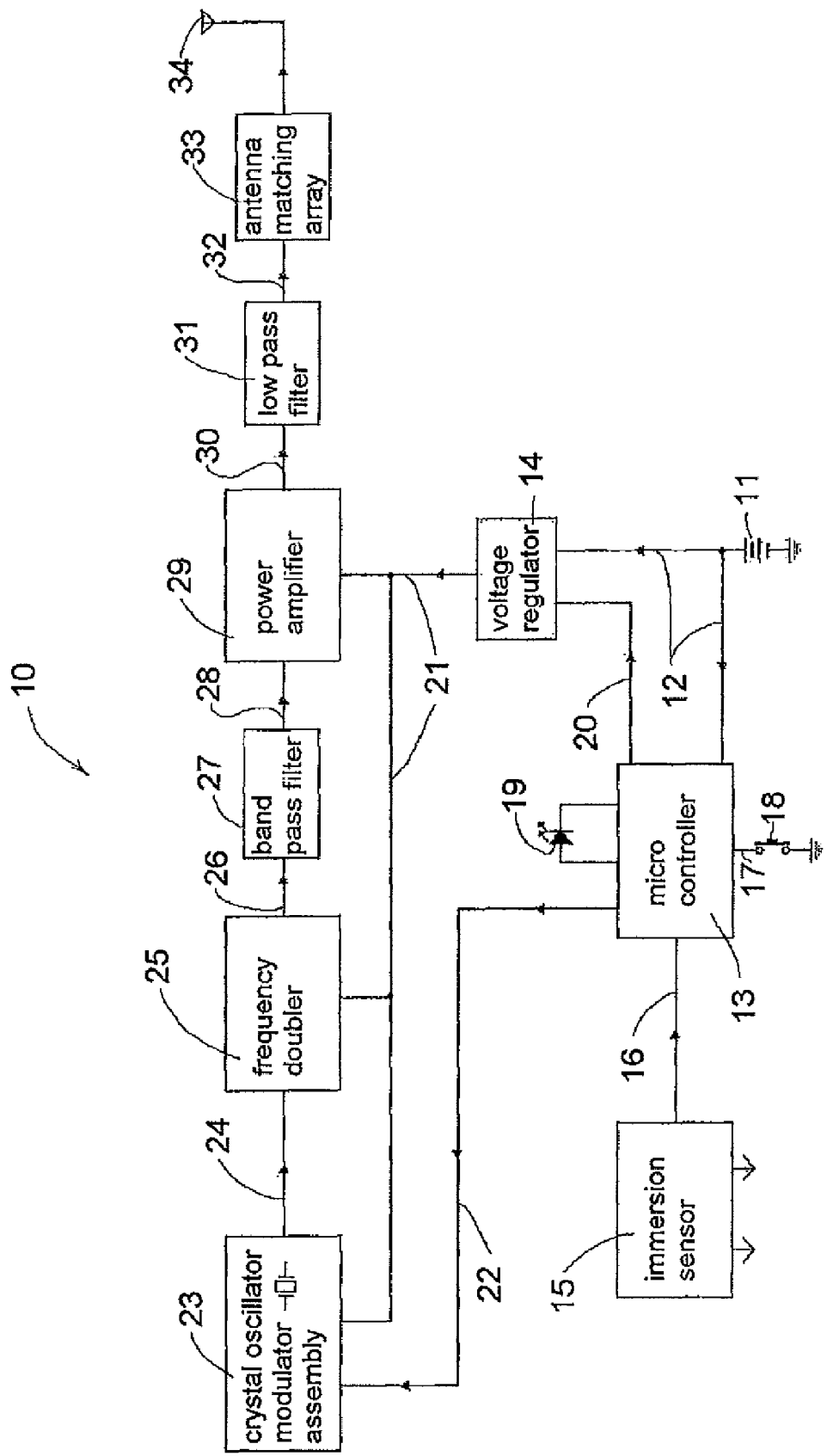
FIG. 1 is a circuit block diagram showing elements of a transmitter unit for marine personal locator apparatus according to the invention.
Figure 2:
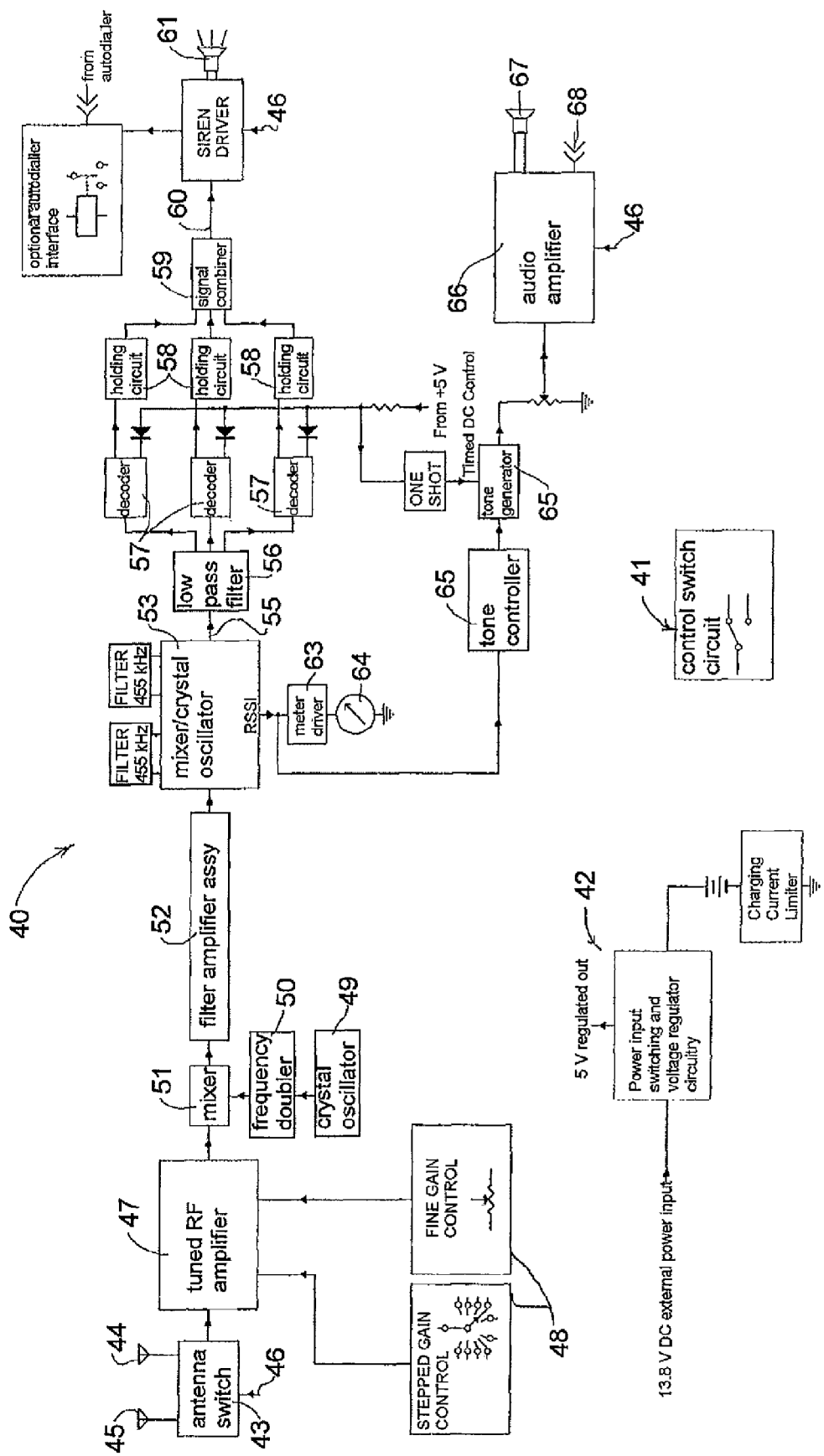
FIG. 2 is a circuit block diagram showing elements of a receiver unit for marine personal locator apparatus according to the invention.

The marine personal safety apparatus 10 shown in FIGS. 1 and 2 includes a transmitter unit having the transmitter circuit 10 shown in FIG. 1 which includes a power supply 11 providing power to a micro controller 13 and a voltage regulator 14 by way of power conductors 12. The micro controller receives an emersion signal from an emersion sensor 15 to receive an emersion signal along an emersion signal conductor 16 connected between the micro controller and the emersion sensor. The micro controller also includes a test switch line 17 going to ground through a test switch 18, and a light emitting diode 19 receiving power for illumination from the micro controller under predetermined conditions.

The micro controller provides an enabling signal to the voltage regulator along a regulator enable line 20. Upon enabling, the voltage regulator produces a regulated voltage along a regulated potential line 21 to other components or groups thereof described below. The micro controller provides modulating tones along a tone signal line 22 to a crystal oscillator modulator assembly 23. The crystal oscillator modulator assembly produces a frequency half that desired along a half frequency line 24. The half frequency line feeds a frequency doubler 25 along the frequency output line 26. Both the crystal oscillator modulator assembly and the frequency doubler receive a regulated potential from the voltage regulator.

A band pass filter 27 conditions the frequency tone received from the frequency doubler to produce a filtered frequency modulated signal along a filtered frequency line 28, the filtered frequency modulated signal being amplified by a power amplifier 29, to produce an amplified signal along a signal transmission line 30 in which the modulating tones are amplified before being further filtered through a low pass filter 31, being passed to an antenna matching array 33 along a filtered signal transmission line 32 to a broadcast antenna 34 for transmission (emission) of a signal as described herein.

The receiver unit shown in FIG. 2 includes a control switch circuit 41 for switching between "search" mode and "alarm" mode, depending upon whether the receiver unit is being used to monitor whether the transmitter becomes activated, or in the alternative whether the receiver unit is being used to find the location of a transmitter unit that has been activated. The receiver circuit also has a power supply 42 for providing power to the respective elements of the circuit, the remainder of which is also shown in FIG. 2.

An antenna switch 43 is used to switch between a Yagi antenna 44 and an omni-directional antenna 45, the switching being determined by a signal from the control switch circuit through input line 46. A tuned radio frequency amplifier 47 is used to amplify the signal, and has typical course and fine gain controls operatively associated therewith. A crystal oscillator 49 uses a frequency half that desired for use in the remained of the circuit, through a frequency doubler 50 for mixing with the amplifier RF signal through a mixer 51, the mixed signal being filtered and amplified through a filter and amplifier assembly 52.

The output of the filter and amplifier assembly is directed to a second mixer/crystal oscillator 53, but in its normal mode awaiting receipt of the signal indicating that a transmitter has been activated the circuitry awaits the transmission of the signal from the transmitter being directed through a AF line 55 through a low pass filter 56 into three tone decoders 57, each having a holding circuit 58 operable to hold the individual tone decoders for a period of six seconds, the output being fed into a signal combiner 59 which, upon seeing all three signals, activates an output through output line 60 to activate a siren 61. In addition to or instead of the siren, an auto dialer circuit 62 the siren also has a connection to the input line at 46 in order to turn the siren off when the operator becomes aware that a signal has been received from an activated transmitter.

When the operator becomes aware that a transmitter has been activated, he or she will change the setting of the control switch circuit to search for the location of the activated transmitter circuit, thereupon activating the alternative circuitry to determine the direction from which the strongest signal from the transmitter is received. A meter driver 63 drives a meter 64 to allow visual observation of the strength of the signal, and in addition a tone controller 65 attached to the RSSI output varies the tone frequency with the signal strength by way of a tone generator 65 to output a sound through an audio amplifier 66 to produce a series of tones through a speaker 67 and or headphones 68 the audio amplifier 66 is operable through activation through the input line 46 when the control switch circuit is in the search position.

The transmitter 70 unit shown in FIGS. 4 to 9 includes a main body 71 housing the circuitry and an antenna module 72 extending from the body the transmitter has a battery test activation button 73 on the body, and the body also has a clamp assembly 74 to which a strap 75 can be mounted for attachment of the transmitter unit.

The main body includes a clear plastic or the like cap 76 on one end, the end from which the antenna extends, and through which a light emitting diode 77 can be observed when the test button or immersion which is activated. On the other end, a rubber cap is provided to seal the unit against accidental ingress of water, the rubber cap having a finger grip 79 for its easy removal to permit a user to remove the rubber cap if they become a victim of an accident requiring activation of the transmitter unit, such as by immersion in water or the like. The unit is activated by penetration through at least one of two probes 80.

The receiver unit 81 shown in FIGS. 10 to 15 (sometimes with the antenna removed) includes a receiver body 82 and a Yagi aerial 83 extending from the receiver body, and a hand grip 84 extending from an aerial mount 85 which omits the mounting of the Yagi aerial to the receiver body.

The receiver body has a receiver face 86 to which two speakers 87, switches, lamps and a meter (the meter shown at 88) are mounted for operation of the receiver unit as described herein. Internally, as shown specifically in FIG. 13, a battery pack 89 is accommodated within the receiver body adjacent the antenna mount which incorporates a release mechanism permitting access to the battery pack. The circuitry and electrical components are also provided within the receiver body, and the housing for the receiver body also includes provision for alternative mounting.

Figure 16:
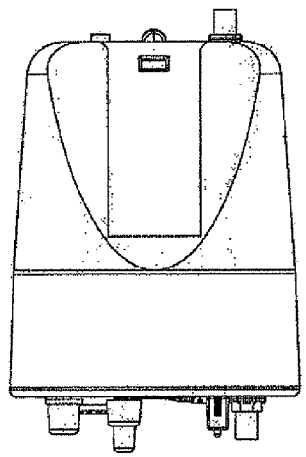
FIGS. 16, 17 and 18 show the front and side elevations and plan view of orthographic projection of an alternative receiver apparatus in accordance with the invention.
Figure 17:
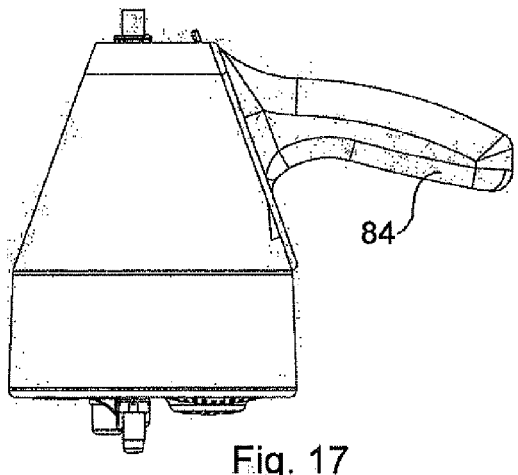
Figure 18:
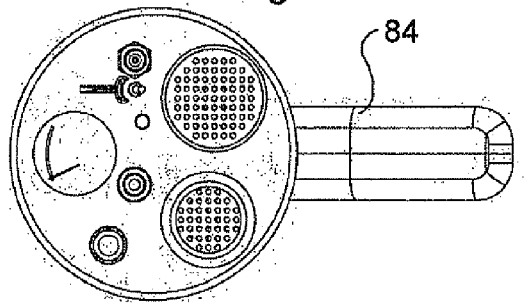
Figure 19:
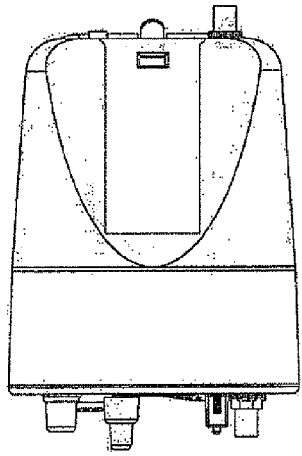
FIGS. 19, 20 and 21 show in side an end elevation and plan view in orthographic projection a further alternative receiver apparatus according to the invention.
Figure 20:
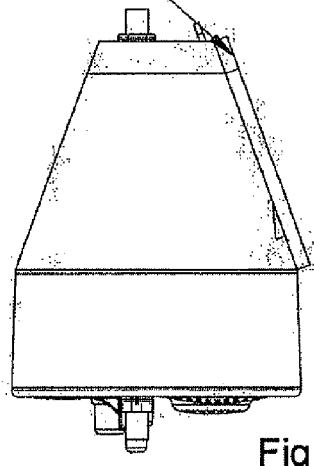
Figure 22:
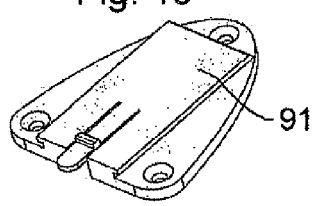
FIG. 22 is a pictorial view of a mounting plate for the further alternative receiver unit of FIGS. 19 to 21.
Figure 21:
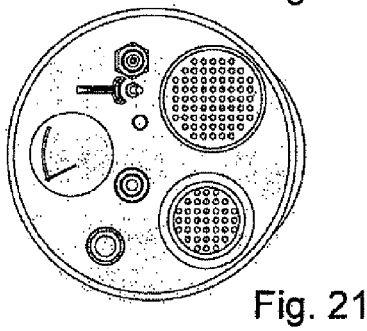

In the version shown in FIGS. 16 to 18, the hand grip is provided for holding the receiver unit, but in the alternative version shown in FIGS. 19 to 21, a surface mounting plate 91 is provided for mounting the receiver unit to a dash board or the like.

In use, the transmitter has a crystal oscillator operating at half the desired frequency. It is frequency modulated by three different low frequency turns generated by the micro controller. This frequency is then fed into the frequency doubler which outputs twice the input frequency. This is then fed to the power amplifier via a band pass filter to remove spurious signals. The amplifier produces the desired level of signal which is then fed to the low pass filter which removes unwanted harmonics. The antenna is fed via a matching network.

The micro controller turns the transmitter on at random intervals by enabling the voltage regulator. It also turns a LED indicator on at random intervals and the microcontroller itself is activated by immersion. There is also a test switch to turn on the transmitter manually or to test the batteries.

There receiver unit can operate off an external power supply or by the internal batteries. When on external supply the battery is being charged at a regulated rate. There is a five volt regulator which supplies all active stages. The desired signal passes through the antenna switch which is normally in the alarm (on the directional) position. The signal is then amplified by the radio frequency amplifier which has five tuned circuits to minimise spurious responses. The radio frequency amplifier has its gain controller by the step gain control and the fine gain control as appropriate to enable searching for the signal. After amplification, the signal is mixed with the doubled crystal oscillator frequency to produce a signal at 21.4 MHz. The output signal thereof is then fed via a crystal filter, amplifier and second crystal filter to the input frequency amp limiter etc block, where upon the signal is mixed down to 450 kHz where it is amplified and further filtered. Two outputs are provided. One is the demodulated audio tones and the other is the radio signalled strength indicator output. At this stage the tone output is the virtual replica of the tones fed into the transmitter modulator. These tones are then passed through a low pass filter to reduce noise and interference.

The tones are then fed into the three tone decoders, where each is tuned to operate at only one of the tones. The direct current output (low going tones) is then fed to through the combiner by way of individual six second hold circuits. Each tone is only transmitted for about 100 milliseconds and the DC output is held steady for approximately six seconds. As the tones are sent at random intervals which may be up to two seconds it could be four seconds before the last tone is received. At this time the combiner sees all three DC signals and gives an output. The output is fed through the siren driver circuit which latches the siren on. If the optional auto dialer is installed the siren is disconnected and the dialer is triggered. Of course this sends an appropriate message to the desired recipient.

When the circuitry detects an produces the siren sound caused by activation of a transmitter unit, the operator manually turns the switch to "search" which turns the siren off. This also switches the antenna switch to the yagi antenna and turns the audio amplifier on. Any of the three tones will trigger the one shot which turns on the tone generator for a predetermined time. The tone generator also has its frequency varied by the signal strength. The tone is heard in the speaker, or if plugged in, the headphones.

The operator can then put the antenna to a direction where the strongest signal is received. This procedure can be followed by observing the signal strength indicated on the meter and by the pitch of the audio tone. The stepped attenuator and fine gain control are then adjusted to provide the best indication of direction turning the stepped attenuator and fine gain control down will give a much sharper indication when turning the antenna.

It is believed that a relatively high power output of approximately 50 milliwatts is proposed to be used in such a small circuit provides an advantage. It is believe this will provide a very good range while at the same time giving about two weeks operation when treated. Random timing is used to enable the operation when several transmitters are operating in the same vicinity. This ensures the alarm signal is decoded correctly.

As some-audible tones are used, a low pass filter can be incorporated attenuating noise and interference. The unit also operate in the frequency modulated mode to reduce noise.

As the three tones have to be received by chance of false triggering is greatly reduced. There are three different indicators of signal strength. Firstly there is the meter, secondly there is the audible change of tone and when the signal strength is reduced, the tone disappears and when the antenna is turned away from the signal direction.

Although the invention has been described with reference to one or more specific examples, it will be appreciated by persons skilled in the art that the invention may be embodied in other forms within the broad scope and ambit of the invention as herein set forth.

The invention claimed is:

1. Marine personal locator apparatus comprising one or more transmitter units operatively wirelessly associated with one or more receiver units, the or each transmitter unit including:

a transmitter power supply;

a transmitter micro controller in electrical connection with the transmitter power supply for controlling electrical power and producing electrical signals according to a predetermined transmitter control program;

a voltage regulator in electrical connection with the power transmitter power supply and in operative connection with the transmitter micro controller for enabling of the voltage regulator to provide a regulated potential output;

a crystal oscillator modulator operatively connected to the regulated potential output from the voltage regulator and in signal connection with the transmitter micro controller for receiving the electrical signals when produced by the transmitter micro controller, the crystal oscillator modulator producing a frequency output being half of a desired frequency;

a frequency doubler in operative connection with the regulated potential output from the voltage regulator and the frequency output from the crystal oscillator modulator for producing a pre-amp frequency output;

filter and amplification means operatively connected to the regulated potential output from the voltage regulator and the pre-amp frequency output from the frequency doubler, the filter and amplification means being operable to provide bandpass filtering, amplification and lowpass filtering of the signal;

an antenna matching network in operative connection with the filter and amplification means for providing transmission signal for broadcasting from a transmitter antenna; and activation means in electrical connection with the transmitter controller operable to provide an activation signal upon detection of a predetermined condition, wherein the transmitter control program is operable to enable the voltage regulator and provide the signal connection to the crystal oscillator modulator only upon receipt of the activation signal;

and the or each receiver unit including:

an omni-directional antenna and uni-directional antenna operatively connected to antenna selection means operable for selection between the omni-directional antenna and the uni-directional antenna, the uni-directional antenna having means for orientation thereof in a range of directions;

a tuned radio frequency amplifier unit in operative connection with a the antenna selection means for amplifying radio frequency signals received by the omni-directional antenna and the uni-directional antenna when selected by the antenna selection means to produce an amplified radio signal;

primary signal mixing means operatively associated with the tuned radio frequency amplifier unit for mixing a predetermined frequency signal with the amplified radio signal to produce a mixed signal;

tuned filter and amplification means operatively associated with the primary signal mixing means for amplifying the predetermined frequency signal portion of the mixed signal to produce a conditioned signal;

a secondary signal mixing means operatively associated with the tuned filter and amplification mean for mixing with a plurality of radio frequency tones, the secondary signal mixing means also incorporating a radio signal strength detection means;

tone decoding and combining means operatively connected to the secondary signal mixing means and operable to receive the radio frequency tones and produce an alarm signal output upon receipt of a predetermined number of the radio frequency tones;

alarm output means operatively connected to the tone decoding and combining means and operable to generate an alarm detectable by a user by sight, sound or other means;

tone control means operatively connected to the secondary signal mixing means and operable in conjunction with the radio signal strength detection means for producing a range of tones correlating with the strength of the amplified radio signal with respect to the strength of the other signals mixed therewith; and output means operatively connected to the tone control means and operable to generate an output detectable by a user by sight, sound or other means.

2. A transmitter unit for marine personal locator apparatus comprising one or more said transmitter units operatively wirelessly associated with one or more receiver units, the or each transmitter unit including:

a transmitter power supply;

a transmitter micro controller in electrical connection with the transmitter power supply for controlling electrical power and producing electrical signals according to a predetermined transmitter control program;

a voltage regulator in electrical connection with the power transmitter power supply and in operative connection with the transmitter microcontroller for enabling of the voltage regulator to provide a regulated potential output;

a crystal oscillator modulator operatively connected to the regulated potential output from the voltage regulator and in signal connection with the transmitter micro controller for receiving the electrical signals when produced by the transmitter micro controller, the crystal oscillator modulator producing a frequency output being half of a desired frequency;

a frequency doubler in operative connection with the regulated potential output from the voltage regulator and the frequency output from the crystal oscillator modulator for producing a pre-amp frequency output;

filter and amplification means operatively connected to the regulated potential output from the voltage regulator and the pre-amp frequency output from the frequency doubler, the filter and amplification means being operable to provide bandpass filtering, amplification and lowpass filtering of the signal; and an antenna matching network in operative connection with the filter and amplification means for providing transmission signal for broadcasting from a transmitter antenna; and activation means in electrical connection with the transmitter controller operable to provide an activation signal upon detection of a predetermined condition, wherein the transmitter control program is operable to enable the voltage regulator and provide the signal connection to the crystal oscillator modulator only upon receipt of the activation signal.

3. The transmitter unit according to claim 1 or claim 2, wherein the predetermined transmitter control program is operable to provide random switching whereby the electrical signals are provided at random intervals upon activation.

4. A transmitter unit according to claim 3, wherein the activation means includes an immersion switch operable to initiate activation of the transmitter unit.

5. The transmitter according to claim 3, wherein the transmitter microcontroller generates three different low frequency tones for frequency modulating the frequency output from the crystal oscillator modulator.

6. The receiver unit according to claim 1, wherein the primary signal mixing means includes a tuned radio frequency amplifier in operative connection with a stepped and fine gain control assembly to enable searching for a signal produced by one or more transmitter units.

7. A receiver unit according to claim 6, wherein the tuned filter and amplification means preferably includes a mixer operatively connected to a crystal oscillator ("the half-frequency oscillator") through a doubler ("the receiver doubler"), and a frequency specific amplifier connected to the mixer through an input filter and to the secondary signal mixing means through an output filter.

8. The receiver unit according to claim 7, wherein the secondary signal mixing means includes a second mixer and secondary crystalline oscillator, an intermediate frequency amplifier and limiter and the radio signal strength indicator detector ("RSSI detector").

9. A receiver unit according to claim 8, wherein the secondary signal mixing means further includes two tone filters.

10. A receiver unit according to claim 6, wherein the tone decoding and combining means includes three tone decoders each in operative connection with a respective hold circuit operable to hold the tone on for a predetermined period of time. Preferably, each tone is held on for a period of six seconds.

11. Marine personal locator apparatus according to claim 1, wherein the combined signal is fed to a siren driver to produce an audible sound upon receipt of the appropriate signal from one or more of the transmitter units.

12. Marine personal locator apparatus according to claim 11, wherein the siren driver includes an autodialler interface for dialling the receiver unit into a telephone network.

13. The transmitter according to claim 4, wherein the transmitter microcontroller generates three different low frequency tones for frequency modulating the frequency output from the crystal oscillator modulator.

14. The receiver unit according to claim 7, wherein the secondary signal mixing means a second mixer and a secondary crystalline oscillator, an intermediate frequency amplifier and limiter and the radio signal strength indicator ("BSSI detector").

* * * * *